United States Patent
Bray et al.

(12) 
(10) Patent No.: US 6,743,492 B2
(45) Date of Patent: Jun. 1, 2004

(54) LAMINATE FOR COFFEE PACKAGING WITH ENERGY CURED COATING

(75) Inventors: Marc Bray, Hartsville, SC (US); David E. McKnight, Florence, SC (US)

(73) Assignee: Sonoco Development, Inc., Hartsville, SC (US)

( * ) Notice: Subject to any disclaimer, the term of this patent is extended or adjusted under 35 U.S.C. 154(b) by 53 days.

(21) Appl. No.: 09/920,084

(22) Filed: Aug. 1, 2001

(65) Prior Publication Data

US 2003/0027009 A1 Feb. 6, 2003

(51) Int. Cl.$^7$ .................................. B32B 1/08
(52) U.S. Cl. .................... 428/35.2; 428/35.3; 428/35.8; 428/35.9; 428/201; 428/203; 428/205; 428/347; 428/349; 428/451; 428/458; 428/463; 428/483; 428/516; 428/520; 428/910
(58) Field of Search ................ 428/35.2, 35.3, 428/35.8, 35.9, 201, 203, 205, 345, 347, 349, 451, 458, 463, 483, 516, 520, 910

(56) References Cited

U.S. PATENT DOCUMENTS

| | | | |
|---|---|---|---|
| 2,029,340 A | 2/1936 | Royal | 93/35 |
| 2,674,509 A | 4/1954 | Barnet | 312/31 |
| 2,909,443 A | 10/1959 | Wolinski | 117/16 |
| 3,269,278 A | 8/1966 | Olstad | 93/35 |
| 3,411,419 A | 11/1968 | Becker et al. | 93/35 |

(List continued on next page.)

FOREIGN PATENT DOCUMENTS

| | | | |
|---|---|---|---|
| EP | 0 737 593 | 10/1996 | |
| EP | 1 247 642 | 10/2002 | B32B/15/08 |
| GB | 2 156 362 | 10/1985 | C08K/5/19 |
| GB | 2 284 787 | 6/1995 | |
| GB | 2 298 818 | 9/1996 | |
| GB | 2 320 911 | 7/1998 | |
| JP | 9-302264 | 11/1997 | |
| WO | WO 90 06265 | 6/1990 | B65D/30/08 |
| WO | WO 96/29205 | 9/1996 | |
| WO | WO 00 35671 | 6/2000 | B32B/27/30 |
| WO | WO 00/53429 | 9/2000 | |
| WO | WO 01/94451 | 12/2001 | |

OTHER PUBLICATIONS

Database WPI, Section Ch, Week 200019, Derwent Publications, XP002219129 & JP 2000 043207.

Japanese Patent Abstract, No. 02–117826, May 2, 1990.

Japanese Patent Abstract, No. 07–186514, Jul. 25, 1995.

McIntyre, "UV–Cured Durable Top Coats: A Replacement for OPP & PET Film Laminations," Presented at Future–Pak 1997, Oct. 28–29, 1997 (together with MCTC–2138 & 2139 Data Sheets).

Morton Adhesives, Mor–Quik® 477 Coating Data Sheets (Feb. 22, 1998).

Morton Adhesives, Mor–Quik® 333 Coating Data Sheets (Sep. 2, 1998).

Fletcher, "New Lower–Voltage EB Systems for Curing Polymers and Coatings," Journal of Coatings Technology, vol. 65, No. 822, pp. 61–63 (Jul. 1993).

(List continued on next page.)

*Primary Examiner*—D. S. Nakarani
(74) *Attorney, Agent, or Firm*—Drinker Biddle & Reath LLP

(57) ABSTRACT

A laminate for coffee packaging is defined. The laminate includes an inorganic gas barrier layer, a strength layer, and an energy cured coating. The laminate provides as good or better barrier properties as a conventional laminate for coffee packaging. However, the laminate of the present invention has non-migratory, "reacted-in" slip agents. Further, the new laminate is more economical to produce than is the conventional laminate.

22 Claims, 1 Drawing Sheet

U.S. PATENT DOCUMENTS

| | | | |
|---|---|---|---|
| 4,070,497 A | 1/1978 | Wismer et al. | 427/44 |
| 4,096,013 A | 6/1978 | Lutzmann et al. | 156/272 |
| 4,177,310 A | 12/1979 | Steeves | 428/216 |
| 4,246,297 A | 1/1981 | Nablo et al. | 427/44 |
| 4,410,560 A | 10/1983 | Kosterka | 427/44 |
| 4,443,491 A | 4/1984 | McIntyre | 427/44 |
| 4,450,028 A | 5/1984 | Vilutis | 156/198 |
| 4,451,529 A | 5/1984 | Kerr, III et al. | 428/319.3 |
| 4,481,669 A | 11/1984 | Pezzana et al. | 383/94 |
| 4,511,596 A | 4/1985 | Berner | 427/44 |
| 4,539,236 A | 9/1985 | Vilutis | 428/35 |
| 4,565,720 A | 1/1986 | Yaeo et al. | 428/35 |
| 4,654,379 A | 3/1987 | Lapin | 522/15 |
| 4,727,706 A | 3/1988 | Beer | 53/434 |
| 4,734,292 A | 3/1988 | Van Bostel | 426/410 |
| 4,835,037 A | 5/1989 | Beer | 428/35.2 |
| 5,017,429 A | 5/1991 | Akao | 428/349 |
| 5,019,202 A | 5/1991 | Kawahata et al. | 156/277 |
| 5,070,121 A | 12/1991 | Hinterwaldner et al. | 524/31 |
| 5,250,334 A | 10/1993 | Lutterotti | 428/35.9 |
| 5,352,466 A | 10/1994 | Delonis | 426/123 |
| 5,478,643 A | 12/1995 | Peiffer et al. | 428/332 |
| 5,492,733 A | 2/1996 | D'Anna et al. | 427/517 |
| 5,527,622 A | 6/1996 | Kato et al. | 428/481 |
| 5,539,033 A | 7/1996 | Bredahl et al. | 525/270 |
| 5,540,916 A | 7/1996 | Parks | 424/76.1 |
| 5,545,419 A | 8/1996 | Brady et al. | 426/129 |
| 5,548,005 A | 8/1996 | Kurth et al. | 523/414 |
| 5,553,942 A | 9/1996 | Domke et al. | 383/101 |
| 5,565,230 A | 10/1996 | Bailey | 426/411 |
| 5,693,385 A | 12/1997 | Parks | 428/34.2 |
| 5,728,439 A | 3/1998 | Carlblom et al. | 428/36.91 |
| 5,763,048 A | 6/1998 | Takahashi | 428/147 |
| 5,770,301 A | 6/1998 | Murai et al. | 428/213 |
| 5,846,620 A | 12/1998 | Compton | 428/35.7 |
| 5,858,543 A | 1/1999 | Futter et al. | 428/447 |
| 5,883,161 A | 3/1999 | Wood et al. | 524/48 |
| 5,908,058 A | 6/1999 | Goglio | 141/364 |
| 5,955,527 A | 9/1999 | Cochran et al. | 524/413 |
| 5,985,426 A | 11/1999 | Wilkie | 428/215 |
| 6,003,670 A | 12/1999 | Beer | 206/459.5 |
| 6,007,902 A | 12/1999 | Adur et al. | 428/219 |
| 6,013,363 A | 1/2000 | Takahashi et al. | 428/315.9 |
| 6,074,097 A | 6/2000 | Hayashi et al. | 383/209 |
| 6,082,897 A | 7/2000 | Galomb | 383/63 |
| 6,096,393 A | 8/2000 | Ikeda et al. | 428/34.7 |
| 6,101,685 A | 8/2000 | Archibald et al. | 24/30.5 R |
| 6,228,486 B1 | 5/2001 | Kittel et al. | 428/354 |
| 6,337,113 B1 | 1/2002 | Muggli et al. | 428/35.2 |
| 6,528,127 B1 | 3/2003 | Edlein et al. | 427/494 |
| 2002/0100194 A1 | 8/2002 | Huffer et al. | 40/310 |
| 2002/0106465 A1 | 8/2002 | Huffer et al. | 428/35.2 |
| 2002/0119295 A1 | 8/2002 | Speer et al. | 428/195 |
| 2002/0146525 A1 | 10/2002 | Huffer et al. | 428/35.3 |

OTHER PUBLICATIONS

Ravijst, "Radiation Cure Applications in the Packaging Industry," Packaging India, pp. 107–109 (Dec. '97).

Guarino, "A Review of Properties and Uses of Radiation Curing for the Near Term and Future," 1990 Polymers, Laminations & Coatings, pp. 891–893 (TAPPI Proceedings 1990).

Pierce & Stevens Corp., Miracure EB Curable Coatings, Product Brochure, "Formulated for Success: Coatings & Adhesives for Packaging and Graphic Arts" (Nov. 1998).

McIntyre, "Total Package Concept: Electron Beam Technology for Barrier, Adhesive, and Overcoat Applications," Presented at Future–Pak '95 (20 pages) (Sep. 13–15, 1995).

Harris, "UV Coating –beyond stick and shine," FlexoTech, pp. 21–22 (Jun. 1998).

Leach et al., The Printing Ink Manual, Chap. 11, pp. 636–677 (Fifth Ed., Kluwer Academic Publishers 1993).

Document entitled "Bottle Wrap Structures and Costs", showing a bottle wrap structure that may have been proposed at least as early as Feb. 14, 1997.

Document entitled "Bottle Wrap Structures and Costs", showing a bottle wrap structure that may have been proposed at least as early as Apr. 6, 1998.

Document entitled "Bottle Wrap Back Up Math", showing a cost savings analysis that may have been proposed at least as early as Jun. 16, 1998.

Document entitled "Huntsman Packaging", showing a structure that may have been proposed at least as early as Oct. 1, 1996.

LAMINATE FOR COFFEE PACKAGING WITH ENERGY CURED COATING

FIELD OF THE INVENTION

The invention relates to the packaging of aromatic food products. Specifically, the invention is directed to an improved laminate for coffee packaging.

BACKGROUND OF THE INVENTION

Packaging coffee and other aromatic materials in containers formed from laminates is known. The laminates used for coffee packaging are designed to minimize the transmission of oxygen, moisture and aromas. Conventional coffee packaging has done a generally good job at keeping coffee fresh and free of unwanted contaminants. Such coffee packaging generally is formed from a sheet of metal foil, various layers of known plastics, and adhesives. A conventional coffee package may have a laminate structure (from inner layer to outer layer) of: polyethylene (PE); biaxially oriented nylon (BON) or inner polyethylene terephthalate (PET); metal foil; and outer polyester, such as PET. A printed ink layer is often reverse printed on the PET layer. U.S. Pat. No. 5,352,466 to Delonis discloses a coffee package which may be formed from a laminate having this general structure.

U.S. Pat. No. 5,250,334 to Lutterotti discloses another laminate for coffee packaging. Lutterotti shows that a metallized layer can be used in place of a foil layer in coffee packaging. In conventional metallized structures, the metallization is deposited onto a substrate of either biaxially oriented polyethylene terephthalate (PET) or biaxially oriented polypropylene (OPP). In one known structure the opposite surface of the PET is coated with saran to provide a heat seal layer. In another known structure, a film of PET and PETG (glycol modified polyethylene terephthalate) is metallized on the surface of the oriented PET layer. In that structure the PETG serves as the sealant layer. In both of the above structures, the metallized surface (and sometimes intervening layers) is then laminated to an abuse resistant layer such as OPP or oriented PET.

The need for an abuse resistant layer is a problem with conventional coffee packaging. An outer web (often PET or OPP), and an adhesive for bonding the web, are required to protect the ink layer from scrapes and abuse. This outer web not only is expensive in the material cost of adhesive and resin, but also in the extra manufacturing step of laminating the outer web onto the laminate.

Another problem with many laminates is the migration of slip agents. Coffee packaging is no exception. Slip agents are commonly added to laminates to enhance the processing thereof. The slip agents reduce the coefficient of friction of the laminate as measured against itself and against machine parts across which the laminate may slide. The decreased coefficient of friction allows the laminate to be easily moved across such surfaces without ripping or wrinkling. However, slip agents are prone to migration which can cause delamination of the laminate as well as interference with adhesion of metal layers and the like.

The inventors of the subject matter described herein have used great skill and effort to find that certain energy curable coatings can be used to protect the ink layer in coffee packaging. This advance not only allows for the elimination of the manufacturing expenses associated with the outer polymer web and the adhesive associated therewith, but also solves the long hexing problem of slip agent migration. Energy curable coatings generally come in two forms, electron beam (EB) curable coatings, and ultra violet (UV) curable coatings. One example of an energy cured coating is disclosed in U.S. Pat. No. 4,654,379 to Lapin which describes a semi-interpenetrating polymer network.

SUMMARY OF THE INVENTION

The present invention is directed to a new laminate which is especially well suited for coffee packaging. The laminate comprises a strength layer, an inorganic layer, and an energy curable layer. Preferably an ink layer is also provided, disposed between the energy curable layer and the strength layer. It is also preferable to provide a sealant layer.

The energy curable layer includes slip agents. The slip agents become "reacted-in" during crosslinking (curing) of the layer. Thus, the slip agents are fixed or, in other words, are non-migratory.

Further, the laminate of the present invention is more economical to produce than a conventional laminate for coffee packaging. Production of a laminate according to the present invention requires fewer raw materials than does a conventional coffee packaging laminate. In addition, the laminate of the present invention may be manufactured in fewer manufacturing steps.

BRIEF DESCRIPTION OF THE DRAWINGS

For the purpose of illustrating the invention, there is shown in the drawings a form which is presently preferred; it being understood, that this invention is not limited to the precise arrangements and instrumentalities shown.

DETAILED DESCRIPTION OF THE DRAWINGS

With reference to the drawings, there is shown a laminate generally identified by the numeral 10. The laminate 10 is preprinted and is well suited for use in coffee packaging.

The laminate of the current invention includes a substantially gas impermeable inorganic layer, a plastic strength layer, and an energy cured outer coating. Various additional layers may be included in preferred embodiments of the invention.

Figure 1:
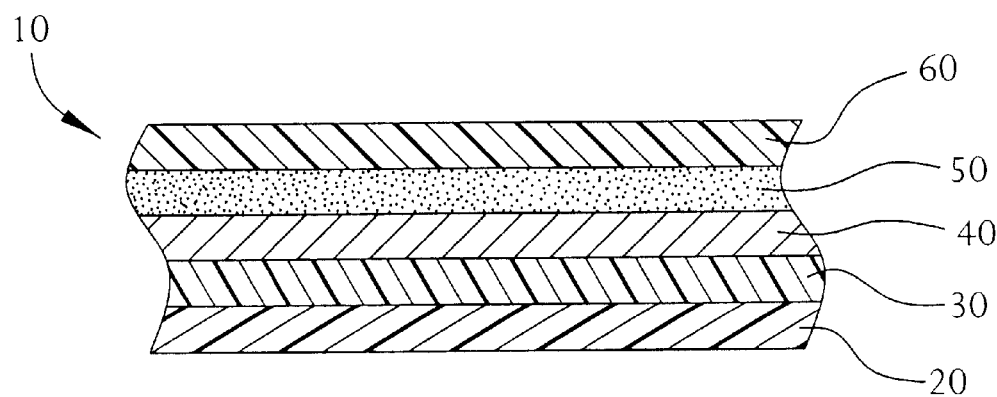
FIG. 1 is a schematic cross sectional view of a laminate according to the present invention.

A preferred embodiment of the invention, represented by laminate 10, is formed using a number of layers as shown in FIG. 1. The layers include a sealing layer 20, an inorganic layer 30, a strength layer 40, an ink layer 50, and an energy cured layer 60. The layers represented in FIG. 1 are represented schematically and are not drawn to scale.

Sealing layer 20 is preferably a layer of polyethylene (PE), used to heat seal the laminate to itself when it is formed into a package. Alternatively, the sealing layer 20 may be formed from any olefin polymer or copolymer having suitable sealing properties. Those skilled in the art will recognize that resins such as low density polyethylene (LDPE), linear low density polyethylene (LLDPE), metallocene-LLDPE or ethylene-vinyl acetate (EVA) may be suitable sealant films.

The strength layer 40 is preferably a layer of polyethylene terephthalate (PET) or oriented polypropylene (OPP), most preferably OPP. The strength layer 40 can alternatively be formed from other plastics having suitable stiffness and strength properties. The term "plastic" is used herein in its broadest sense, including thermosetting and thermoplastic materials. The plastic forming the strength layer 40 should be resistant to puncture and other abuses that packages typically encounter. In some embodiments of the invention, strength layer 40 may be sealable to itself via heat sealing or by numerous other means. In such embodiments, strength layer 40 performs the main function of sealing layer 20, which may therefore be omitted.

An inorganic layer 30 is formed on the strength layer 40. A thin layer of metallization, preferably aluminum, may be formed through a vacuum deposition process. In the metallization process, a thin layer of metal is vapor deposited onto the strength layer 40. While the metallized layer is very thin, it can serve as an effective barrier to transmission of all gases when applied to an appropriate substrate. Metallization also provides an aesthetically pleasing appearance.

Aluminum oxide and silicon oxide ($Al_2O_x$ or $SiO_x$) are also useful coatings, particularly as a barrier to oxygen and moisture. Thus, the inorganic layer 30 may be alternatively formed from these oxides. The coatings can be applied to the strength layer 40 by any means known in the art, including the use of a high energy electron beam evaporation process, chemical plasma deposition, and sputtering. Another method of forming an aluminum oxide or silicon oxide coating involves the treating of the sheet with an aqueous solution having an appropriate pH level to cause the formation of aluminum oxide or silicon oxide on the sheet.

Thus, an inorganic layer 30 is formed on strength layer 40. The inorganic layer 30 may be only a few hundredths of a mil thick, a mil being 1/1000 of an inch. (It is noteworthy that the thickness of inorganic layer 30 is greatly exaggerated in FIG. 1 for purposes of clarity in defining the structure of the laminate.) The strength layer 40 and inorganic layer 30 of this embodiment may be referred to jointly as a single metallized OPP layer.

The laminate 10 is preferably provided with printing. Thus, an optional ink layer 50 is shown in FIG. 1. Ink layer 50 is surface printed with any acceptable printing technique, such as flexography, well known to those skilled in the art. Alternative means for printing on a thermoplastic web are equally well known. The printing unit applies an ink layer 50 to the strength layer 40. The printing may contain indicia to identify the source of the goods on which the laminate 10 is to be affixed. The printing may also contain nutritional information or other facts relevant to a potential purchaser, such as expiration date or price. Ideally, the printed image is eye catching and attractive to the consumer, thereby enticing a sale of the goods in which the package formed from laminate 10 is contained. After ink application, the film is preferably run through a drying unit to dry the ink layer 50.

An energy curable coating 60 (also shown in FIG. 1 in exagerated proportion) is applied to laminate 10 to protect the ink layer 50 and the inorganic layer 30. The energy curable coating 60 is coated on to the strength layer 40, thereby sandwiching ink layer 50 between the energy curable coating 60 and strength layer 40. Most any conventional coating unit, well known to those skilled in the art, may be employed for this purpose.

It is preferable that the energy curable layer 60 be curable by an electron beam. The electron beam curable coating may comprise a number of species of suitable compounds. One group of compounds which has been found to be suitable is sold by Rohm & Haas under the registered trademark MOR-QUIK, owned by Morton International, Inc., a subsidiary of Rohm & Haas. The materials best suited for the coating 60 are a combination of oligomers and monomers. The preferred oligomer is an epoxy acrylate. The preferred monomer is an acrylate. The monomers act as diluents, used to reduce the viscosity of the coating for application purposes. The concentration of monomer is adjustable to provide a wide range of viscosity, such that many conventional coating systems may be employed to apply the electron beam curable coating. The blend ratio of oligomer and monomer also controls physical properties and adhesion of the coating.

Various desirable additives, the exact nature of which will depend on the specifications of the laminate desired, may also be added. Often, defoamers and slip agents are desirable. It is well known to provide such additives to polymer films to improve various qualities such as coefficient of friction, gloss, and processing qualities. The additives provided with the laminate of the present invention become "reacted-in" during crosslinking of the electron beam curable coating. For example, the slip agents, provided to improve the coefficient of friction, are fixed in the crosslinking process, and are therefore not susceptible to the common problems associated with slip agent migration in laminates. The stability of the electron beam curable coating and its additives therefore allows for greater control of the gloss and slip qualities of the laminate, allowing a manufacturer to create laminates according to demanding specifications.

The electron beam curable coating is cured using a suitable electron beam source. Suitable electron beam sources may be obtained commercially from Energy Science, Inc. of Wilmington, Mass.

The amount of energy absorbed, also known as the dose, is measured in units of MegaRads (MR or Mrad) or kiloGrays (kGy), where one Mrad is 10 kGy, one kGy being equal to 1,000 Joules per kilogram. The electron energy output should be within the range of 110 keV to 170 keV at a dosage of 2.5 to 5.0 MegaRads. Preferably, the energy is within the range of 125 keV to 135 keV at a dosage of 3.0 to 4.0 MegaRads.

When exposed to an electron beam from a suitable source, acrylate monomer reacts with the epoxy acrylate chains to form crosslinks. The precursor molecules are excited directly by the ionizing electron beam. Therefore no initiator compounds are required, so no residual volatile organic compounds are present in the finished product. Moreover, curing is substantially instantaneous and provides a cure percentage at or near one hundred percent.

It has been found that the electron beam curable coating of the present invention can be processed at manufacturing speeds in excess of 1000 feet per minute. Such processing speeds are a great improvement over typical lamination speeds which are about 600 feet per minute.

Further, the laminate of the present invention can be less costly to produce than a conventional laminate. Production is less expensive because a second pass through a laminator is not required and because fewer raw materials are required. In the preferred embodiment of the present invention, the metallized OPP layer (the combination of strength layer 40 and inorganic layer 30) performs the tasks of two layers in a conventional laminate, namely a foil layer and a biaxially oriented nylon or inner polyethylene terephthalate layer. Moreover, no outer protective web nor adhesive for bonding is required, the ink layer 50 being protected by the energy cured layer.

The laminate of the present invention may be manufactured by a process involving a series of rollers, means to coat or deposit the inorganic layer, a printing station, means to coat the electron beam curable coating on to the film, and an electron beam source. The sealant layer and strength layer may be joined through a co-extrusion or through an adhesive application, both processes well known to those skilled in the art.

Figure 2:
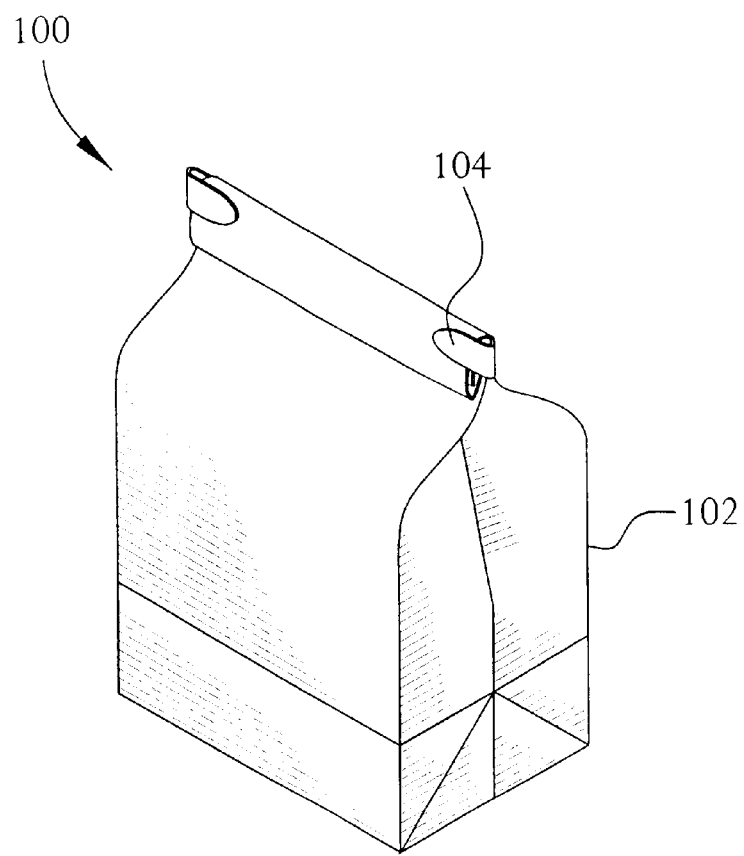
FIG. 2 is a perspective view of a coffee package according to the present invention.

As noted above, the laminate of the current invention is ideal for use in the production of coffee packaging. FIG. 2 shows a coffee package 100 formed from the laminate described herein. Coffee package 100 is preferably formed in the shape of a bag 102. The bag 102 should be of the type which can be rolled or folded downwardly. It is preferable that means for holding the bag closed also be provided, thereby more effectively keeping the coffee fresh. In FIG. 2, such means, shown as non-resiliently flexible tabs, are labeled as elements 104.

The present invention may be embodied in other specific forms without departing from the spirit or essential attributes thereof and, accordingly, reference should be made to the appended claims, rather than to the foregoing specification, as indicating the scope of the invention.

What is claimed is:

1. A coffee packaging laminate comprising in order:
   an inorganic layer
   a strength layer; and
   an energy cured layer comprising a non-migratory slip agent.

2. The laminate of claim 1 further comprising a sealant layer disposed on the inorganic layer opposite the strength layer.

3. The laminate of claim 1 further comprising an ink layer sandwiched between the strength layer and the energy cured layer.

4. The laminate of claim 1 wherein the strength layer is oriented polypropylene.

5. The laminate of claim 1 wherein the strength layer is polyethylene terephthalate.

6. The laminate of claim 1 wherein the energy cured layer is electron beam cured and comprises a combination of oligomers and monomers.

7. The laminate of claim 6 wherein the oligomer is an epoxy acrylate.

8. The laminate of claim 6 wherein the monomer is an acrylate.

9. The laminate of claim 6 wherein the electron beam cured layer is cured by an electron beam having an energy of from about 110 keV to about 170 keV.

10. The laminate of claim 9 wherein the electron beam cured layer is cured by an electron beam having an energy of from about 125 keV to about 135 keV.

11. The laminate of claim 6 wherein the electron beam cured layer is cured by absorbing a dosage of from about 2.5 to about 5.0 MegaRads.

12. The laminate of claim 11 wherein the electron beam cured layer is cured by absorbing a dosage of from about 3.0 to about 4.0 MegaRads.

13. The laminate of claim 1 wherein the inorganic layer is a metallized aluminum layer.

14. The laminate of claim 1 wherein the inorganic layer is an oxide selected from the group consisting of $SiO_x$ and $Al_2O_x$.

15. A coffee package comprising a laminate having:
   an inorganic layer;
   a plastic strength layer;
   an electron beam cured coating coated on the plastic strength layer; and
   ink disposed between the plastic strength layer and the electron beam cured coating.

16. The coffee package of claim 15 wherein the plastic strength layer is oriented polypropylene.

17. The coffee package of claim 15 wherein the plastic strength layer is polyethylene terephthalate.

18. The coffee package of claim 15 wherein the plastic strength layer is metallized to form the inorganic layer.

19. The coffee package of claim 15 wherein the electron beam cured layer is formed from an epoxy acrylate oligomer and an acrylate monomer.

20. The coffee package of claim 15 further comprising a sealant layer adhered to the plastic strength layer opposite the electron beam cured layer.

21. The coffee package of claim 15 wherein the electron beam cured layer comprises non-migratory slip agents.

22. A coffee package comprising:
   a laminate comprising a surface printed plastic strength layer;
   an inorganic layer coated on the plastic strength layer; and
   an electron beam cured coating on the printed side of the plastic strength layer, the electron beam cured coating comprising a fixed slip agent.

* * * * *